United States Patent [19]
Johnston et al.

[11] Patent Number: 5,990,257
[45] Date of Patent: Nov. 23, 1999

[54] PROCESS FOR PRODUCING PREPOLYMERS WHICH CURE TO IMPROVED SEALANTS, AND PRODUCTS FORMED THEREBY

[75] Inventors: Robert R. Johnston, Versoix, Switzerland; Patrice Lehmann, Vetraz-Monthoux, France

[73] Assignee: Witco Corporation, Greenwich, Conn.

[21] Appl. No.: 09/009,868

[22] Filed: Jan. 22, 1998

[51] Int. Cl.$^6$ .......................... C08G 18/71; C08G 18/10; C08G 77/18; C08G 77/26

[52] U.S. Cl. .................. 528/28; 528/29; 528/59; 528/69; 556/414; 556/420

[58] Field of Search ................... 528/28, 29, 59, 528/69; 556/414, 420

[56] References Cited

U.S. PATENT DOCUMENTS

| | | | |
|---|---|---|---|
| 3,033,815 | 5/1962 | Pike et al. | 528/38 |
| 3,627,722 | 12/1971 | Seiter | 524/869 |
| 3,632,557 | 1/1972 | Brode et al. | 528/28 |
| 3,979,344 | 9/1976 | Bryant et al. | 528/22 |
| 4,067,844 | 1/1978 | Barron et al. | 525/453 |
| 4,209,455 | 6/1980 | Pepe | 556/419 |
| 4,222,925 | 9/1980 | Bryant et al. | 524/589 |
| 4,345,053 | 8/1982 | Rizk et al. | 525/440 |
| 4,374,237 | 2/1983 | Berger et al. | 528/28 |
| 4,625,012 | 11/1986 | Rizk et al. | 528/28 |
| 4,645,816 | 2/1987 | Pohl et al. | 528/28 |
| 5,126,170 | 6/1992 | Zweiner et al. | 528/68 |
| 5,364,955 | 11/1994 | Zweiner et al. | 556/418 |
| 5,623,044 | 4/1997 | Chiao | 528/28 |
| 5,670,601 | 9/1997 | Allen et al. | 528/76 |

FOREIGN PATENT DOCUMENTS

| | | |
|---|---|---|
| 650872 | 10/1991 | Australia . |
| 676403 | 10/1995 | European Pat. Off. . |

*Primary Examiner*—Rabon Sergent
*Attorney, Agent, or Firm*—Edward K. Welch, II; Andrew S. Reiskind; Timothy X. Witkowski

[57] ABSTRACT

Silylated polyurethanes exhibiting a superior combination of mechanical properties and which cure in reasonable time to a low-tack sealant, without excessive viscosity, are prepared by reacting a polyol component having terminal unsaturation of less than 0.2 meq/g with a diisocyanate component to form a hydroxyl-terminated prepolymer, and endcapping the prepolymer with an isocyanate silane of the formula $OCN-R-Si-(X)_m(-OR^1)_{3-m}$ wherein m is 0, 1 or 2, each $R^1$ is alkyl containing 1 to 4 carbon atoms, each X is alkyl containing 1 to 4 carbon atoms, and R is a difunctional organic group.

18 Claims, No Drawings

PROCESS FOR PRODUCING PREPOLYMERS WHICH CURE TO IMPROVED SEALANTS, AND PRODUCTS FORMED THEREBY

FIELD OF THE INVENTION

The present invention relates to silylated, that is, silane end-capped, polyurethane prepolymers and to compositions made therefrom.

BACKGROUND OF THE INVENTION

Urethane polymers have in the past been modified to modulate their finctionality by endcapping some or all of the isocyanate groups with a variety of organosilanes to yield silane end-capped urethane polymers containing minimal or no isocyanate groups. For example, in U.S. Pat. No. 3,632, 557 to Brode and Conte, the complete end-capping of polyurethanes with primary and secondary aliphatic aminosilanes was disclosed, yielding silane-terminated polymers that were curable at room temperature. In U.S. Pat. No. 3,979,344, Bryant and Weis disclosed that a small amount of 3-(N-2-aminoethyl)-aminopropyltrimethoxysilane blended with vulcanizable silane-terminated polyurethanes yielded room-temperature-curable silane-terminated sealant compositions having improved cure speeds, useful in metal and glass primer compositions. Bryant et al., in U.S. Pat. No. 4,222,925, disclosed the same composition as that set out in U.S. Pat. No. 3,979,344, with the addition of a high strength reinforcing carbon black filler, and optionally, a moisture curing catalyst such as dibutytin diacetate.

In U.S. Pat. No. 4,374,237 to Berger, et al., curable isocyanate-terminated polyurethanes having at least some of the terminal isocyanate groups reacted with a secondary amine containing silane monomer having two trialkoxy silane groups were described. The compounds were disclosed as being useful in sealant compositions having enhanced wet adhesion.

Other silane end-capped urethane polymers and sealants were disclosed in U.S. Pat. No. 3,627,722 to Seiter, which described polyurethane sealants such as alkylaminoalkyltrialkoxysilanes, mercaptoalkyltrialkoxysilanes, and arylaminoalkyltrialkoxysilanes containing a significant percentage, but preferably less than all, of terminal isocyanate groups endblocked with—Si(OR)3, where R was a lower alkyl group; in U.S. Pat. No. 4,067,844 to Barron and Turk, which disclosed curable poylurethanes in which a portion of the NCO terminations are reacted with certain amino silanes (or with the residue on reaction of a mercaptosilane with monoepoxide, or with the residue on reaction of an epoxysilane with a secondary amine); in U.S. Pat. No. 4,345,053 to Rizk, et al., which disclosed a moisture-curable silane-terminated polymer prepared by reacting a polyurethane having terminal active hydrogen atoms with an isocyanato organosilane having a terminal isocyanate group and at least one hydrolyzable alkoxy group bonded to silicon; and in U.S. Pat. No. 4.625,012 to Rizk and Hsieh, which disclosed a moisture-curable polyurethane having terminal isocyanate groups and silane groups having at least one hydrolyzable alkoxy group bonded to silicon, in which the silane groups may be pendant to the chain.

Silane-endcapped urethane sealants frequently exhibit insufficient flexibility to be useful in applications requiring considerable extension and compression. To overcome these problems, U.S. Pat. No. 4,645,816 to Pohl and Osterholtz described a novel class of room-temperature, moisture-curable, silane-terminated polyurethanes bearing terminal isocyanate groups reacted with a silane monomer having one dialkoxy silane group and an organo-functional group with at least one active hydrogen. The polymers were crosslinked to produce elastomeric networks with improved flexibility.

Another approach to reducing the crosslinking density of the cured elastomers, is to use secondary aminosilanes with bulky substituents on the nitrogen as silane endcappers, preferably reacting all free isocyanate endgroups with these secondary amino silanes. Feng reported in European Patent Application No. 676,403 that the use of arylaminosilanes, particularly having one dialkoxy silane group provided the added benefit of further improved flexibility. Zwiener, et al. disclosed in U.S. Pat. No. 5,364,955 similar benefits using certain N-alkoxysilylalkyl-aspartic acid esters.

The use of difunctional silanes and/or sterically hindered silanes, typically employing amine reactivity for the end-capping of the urethane prepolymers, suffers from several drawbacks. The secondary amine containing silanes are slow to react with the urethane prepolymer while polymer endcapped with dialkoxyfunctional silanes are typically very slow to cure. Particularly the formation of urea which is experienced when using amino silanes leads to a meaningful increase in viscosity of the prepolymer, potentially resulting in processing problems and application restrictions.

Employing trialkoxy silane groups as endcappers for silylated precursors intended to have considerable flexibility has heretofore required forming extended polymer chains with a significantly high average molecular weight to balance out the crosslinking density inherent in the use of the trifunctional endcapper. This however has led to increased viscosity of the eventual product, to unacceptably high levels particularly using amino silane endcappers building urea bonds. The synthesis routes to build up chain length via the polyurethane polyaddition reaction using conventional polyether polyols have exhibited the problem of low to negligible residual functionality of the urethane prepolymer before silane endcapping. Hence, synthesis of these types of systems may be not feasible, and/or these systems may offer unacceptable cure profiles and mechanical properties.

Thus, there remains a need for silylated polyurethane precursors that offer simultaneously favorable viscosities, faster cure, and significantly improved mechanical properties, flexibility, and no residual tack after final cure.

BRIEF SUMMARY OF THE INVENTION

One aspect of this invention is the synthesis of high molecular weight urethane polymers, endcapped with alkoxyfunctional silanes, that offer satisfactory properties and flexibility after final cure of the siloxane-crosslinked polymer network. Use of such functional silane endcappers, and especially trifunctional silane endcappers, offers the added benefit of fast cure speeds. It has been found that silylated polyurethanes offering non-brittle, elastic materials can be prepared using extremely low-unsaturation polyether polyols in the formation of the polyurethane prepolymers that are silylated.

Thus, one aspect of the present invention is a process for preparing a silylated polyurethane, comprising (A) reacting (i) a polyol component having terminal unsaturation less than 0.2 milliequivalents per gram of polyol, with (ii) a diisocyanate component at a stoichoimetric excess of said polyol component to said diisocyanate component, whereby a polyurethane prepolymer is formed which is hydroxyl-terminated; and (B) reacting said polyurethane prepolymer with one or more isocyanate silanes of the formula OCN—R—Si—(X)$_m$(—OR$^1$)$_{3-m}$ wherein m is 0, 1 or 2, each R$^1$ is alkyl containing 1 to 4 carbon atoms and preferably methyl or ethyl, each X is alkyl containing 1 to 4 carbon atoms and preferably methyl or ethyl, and R is a difunctional organic group and preferably straight or branched difinctional alkyl containing 2 to 6 carbon atoms, to endcap the hydroxyl groups on said prepolymer with said isocyanate silane.

The polymerization of alkylene oxide in the presence of metal complex catalysts allows for the synthesis of polyether polyols with higher molecular weight and very low unsaturation level. These polyether polyols are ideal starting materials for the synthesis of very high molecular weight polyurethanes via polyaddition reaction. Their inherent high molecular weight enables diminishing amounts of hard segments for the build up of urethane polymer chain length resulting in drastically lower viscosities of the urethane prepolymers. Moreover their low unsaturation level permits increasing the urethane prepolymer molecular weight without loss of functionality during chain extension for ultimate silane endcapping and final curing.

Another aspect of the present invention is silylated polyurethanes prepared by the aforementioned process. This aspect of this invention permits the synthesis of very high molecular weight silylated polyurethanes which demonstrate significant lower residual surface tack. By comparison, the use of conventional polyether polyols as educts for the synthesis of urethane prepolymers with increased molecular weight typically leads to the disadvantage of excessive residual surface tack in the final products. This aspect of the present invention thus provides high molecular weight, low viscosity silylated polyurethanes using isocyanate alkoxy silane endcappers, which silylated products are excellent precursors for formulations of sealants, adhesives, coatings, and the like. Formulations employing these precursors simultaneously exhibit lower viscosities, convenient processing and workability, fast cure profiles, and improved mechanical properties and flexibility, in an elastic, flexible material exhibiting little or no residual surface tack.

DETAILED DESCRIPTION OF THE INVENTION

Polymers

Urethane polymers bearing terminal active hydrogen atoms which are useful in the present invention can be prepared by the reaction of an organic di- or polyisocyanate reactant component with a stoichiometric excess of a polyol reactant component which can be a polyether polyol or comprises a combination of polyols. Depending on the reactivity of the respective reactants, a catalyst might be employed. The reaction temperature is typically in the range of 60° to 90° C.; the reaction time is typically on the order of about 2 to 8 hours. Example preparations are set out in the next section.

Suitable organic di- and polyisocyanates include diisocyanates such as 2,4-toluene diisocyanate, 2,6-toluene diisocyanate, 4,4'-diphenyl-methanediisocyanate, 2,4'-diphenyl-methanediisocyanate, isophorone diisocyanate ("IPDI"), 4,4'-dicyclohexylmethane-diisocyanateisomers, Desmodur N and the like, and mixtures thereof.

For the production of the urethane prepolymers one or more diols and triols can be employed in the reaction such as polyether polyols, polyester polyols, polybutadienediols, polyoxyalkylene diols, polyoxyalkylene triols, polytetramethylene glycols, polycaprolactone diols and triols, and the like, having two or more hydroxyl groups. Preferred polyols used in the present invention are polypropylene glycols. The polyols employed in the present invention have a very low unsaturation level and therefore high finctionality. Said polyols are typically prepared using metal complex catalysts for the polymerisation of alkylene oxide resulting in polyols having a low level of terminal ethylenic unsaturation that is generally less than 0.2, preferably less than 0.1, and more preferably less than 0.02, milliequivalents per gram (meq/g) of polyol. The molecular weight of the polyols is typically in the range between 500 and 50,000, preferably between about 2000 and 20,000.

To prepare active hydroxyl group-terminated polyurethanes useful in this invention, at least a slight molar excess of the hydroxyl equivalents (—OH groups) with respect to the —NCO equivalents (groups) is employed to terminate the polymer chains with hydroxyl groups. The preferred molar ratio of the NCO to OH is from about 0.3 to 0.95, and more preferably between 0.5 and 0.85, depending on the polyol in use.

Organofunctional silane endcappers suitable in the present invention for the endcapping of the active hydrogen terminal atoms bearing urethane prepolymers are represented by the general formula:

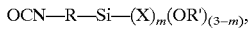

OCN—R—Si—(X)$_m$(OR')$_{(3-m)}$, wherein R is a divalent organic group, each R' is alkyl having 1 to 4 carbon atoms, X is an alkyl group having from 1 to 4 carbon atoms, and m is an integer from 0 to 2. Group R can have any of a wide variety of structures forming a stable bridge between the terminal isocyanate group and the alkoxysilane group. A number of structures for such isocyanato alkoxysilane compounds are illustrated for example, in columns 4 and 5 of U.S. Pat. No. 4,146,585, incorporated herein by reference. Preferably, however, R is a lower alkylene group having 2 to 6 carbon atoms and more preferably at least 3 carbon atoms therein. Particularly preferred materials for use according to the present invention are gamma-isocyanatopropyl-triethoxy silane and gamma-isocyanatopropyl-trimethoxy silane.

The urethane prepolymer having active hydrogen atoms is reacted in an approximately stoichiometric amount with the above described isocyanate silane to form a stable prepolymer having one or more terminal alkoxysilane groups.

The urethane prepolymer synthesis as well as the subsequent silylation reaction are conducted under anhydrous conditions and preferably under an inert atmosphere, such as a blanket of nitrogen, to prevent premature hydrolysis of the alkoxysilane groups. A typical temperature range for both reaction steps, is 0° to 150° C., and more preferably between 60° and 90° C. Typically, the total reaction time for the synthesis of the silylated polyurethane is between 4 to 8 hours.

Catalysts typically used in the preparation of the above mentioned urethane prepolymers as well as of the related silylated polyurethanes are dialkyltin dicarboxylates, such as dibutyltin dilaurate and dibutyltin acetate, tertiary amines, the stannous salts of carboxylic acids, such as stannous octoate and stannous acetate, and the like. The preferred catalyst used in the present invention is dibutyltin dilaurate.

The synthesis is monitored using a standard titration technique (ASTM 2572-87) and infrared analysis. Silylation of the urethane prepolymers is considered complete when no residual NCO can be monitored by either technique.

Sealants

One-part sealant formulations incorporating the above silane terminated urethane polymers can be prepared by mixing together the silylated polyurethane and any of the customary functional additives, such as one or more fillers, plasticizers, thixotropes, antioxidants, U.V. stabilizers, adhesion promoter(s) and/or cure catalyst. Satisfactory mixing is obtained using a double planetary mixer. Typically, the silylated urethane polymer, fillers, stabilizers and plasticizer are mixed at 80° C. for 60 to 90 minutes in vacuum. After cooling to 50° C., the desired silane adhesion promoter, dehydrating agent and cure catalyst are added and the mixture is stirred for an additional 30 minutes under a blanket of nitrogen.

Typical fillers suitable for formulation of the sealants include reinforcing fillers such as fumed silica, precipitated silica and calcium carbonates. To further improve the physical strength of the formulations, reinforcing carbon black can be used as a main filler, leading to black systems. Several commercial grades of carbon black useful in this invention are available, such as "Corax" products (Degussa). To obtain translucent formulations, higher levels of fumed silica or precipitated silica should be used as the main filler, without carbon black.

Treated calcium carbonates having particle sizes from 0.07 μm to 4 μm are preferred fillers and are available under several trade names, such as: "Ultra Pflex" and "Hi Pflex" from Specialty Minerals; "Winnofil SPM" and "Winnofil SPT" from Zeneca Resins; "Hubercarb 1Qt", "Hubercarb 3Qt" and "Hubercarb W" from Huber and "Kotomite" from ECC. These fillers can be used either alone or in combination. The fillers generally comprise up to 200 parts per 100 parts of the silylated urethane polymer with 80 to 150 parts being the more preferred loading level.

The plasticizers customarily employed in polyurethane sealants can also be used in the invention to modify the properties and to facilitate use of higher filler levels. Exemplary plasticizers include phthalates, dipropylene and diethylene glycol dibenzoates and mixtures thereof, epoxidized soybean oil and the like. Useful sources of dioctyl and diisodecylphthalate include those available under the tradenames "Jayflex DOP" and "Jayflex DIDP" from Exxon Chemical. The dibenzoates are available as "Benzoflex 9-88", "Benzoflex 50" and "Benzoflex 400" from Velsicol Chemical Corporation. The soybean oil is available from Union Carbide Corporation as "Flexol EPO". The plasticizer typically comprises up to 100 parts per hundred parts of the silylated urethane polymer with 40 to 80 parts per hundred being preferred.

The sealant formulation can include various thixotropic or anti-sagging agents. This class of additives are typified by various castor waxes, fuimed silica, treated clays and polyamides. These additives typically comprise 1 to 10 parts per hundred parts of silylated urethane component with 1 to 6 parts being preferred. Useful thixotropes include those available as: "Aerosil" from Degussa, "Cabo-Sil TS 720" from Cabot, "Castorwax" from CasChem, "Thixatrol" and "Thixcin" from Rheox, and "Dislon" from King Industries.

U.V. stabilizers and/or antioxidants can be incorporated into the sealant formulations of this invention in an amount from 0 to 5 parts per hundred parts of silylated urethane polymer with 0.5 to 2 parts being preferred. These materials are available from companies such as Great Lakes and Ciba-Geigy under the tradenames "Anox 20" and "Uvasil 299 HM/LM" (Great Lakes), and "Irganox 1010", "Tinuvin 770", "Tinuvin 327", "Tinuvin 213", "Tinuvin 622 LD" (Ciba-Geigy), respectively.

Various organofunctional silane adhesion promoters are useful in the sealant formulation of the present invention. These materials are typically employed at levels of 0.5 to 5 parts per hundred parts of the silylated urethane polymer, with 0.8 to 2.0 parts per hundred parts of polymer being preferred. Suitable adhesion promoters include "Silquest A-1120" silane, "Silquest A-2120" silane, "Silquest A-1110" silane, "Silquest A-1 170" silane and "Silquest A-187" silane, all of which are available from Witco's OrganoSilicones Group.

Suitable cure catalysts are the same as those that have been previously described for preparation of the silylated urethane polymers. The catalysts typically comprise 0.01 to 3 parts per hundred parts of silylated urethane polymer, with 0.01 to 1.0 parts per hundred parts of polymer being preferred.

After mixing, the sealants are typically cured at 23° C. and 50% relative humidity for 14 days.

Test Procedures

After synthesis, a portion of the silylated polyurethane was thoroughly mixed with 1% by weight of dibutyltin dilaurate as curing catalyst. The homogeneous mixture of the catalyst and the silylated polymer was subsequently cast into Teflon molds and installed for two weeks at 23° C. and 50% relative humidity in a climatic chamber for curing. The cured polymer films were tested thereafter as described herein using the test procedures applied to the corresponding sealants.

The viscosities of the urethane prepolymers, the related silylated polyurethanes, and the formulated sealants were determined with an ICI cone & plate viscometer, typically at 156 $s^{-1}$ and ambient conditions.

The physical properties of the cured silylated polyurethanes and the related sealants were tested according to the American Society for Testing and Materials (ASTM) Method D 412 for tensile strength, revealing the values for tensile strength at break, elongation at break and 100% modulus, and according to the ASTM Method D 624 for tear strength.

The hardness of the materials was observed using Shore A hardness testing.

The residual tack of the cured systems was observed by finger touch and was measured on a scale of 4 to 0, where 4 stands for no residual tack and 0 for very tacky.

The following cases are representative examples for the above described polymer and related sealant systems. Table 1 summarizes the polymer systems revealing typical formulations. The properties and claimed benefits of the particular polymer films and related sealants systems are shown in Table 2 and Table 3, respectively.

EXAMPLES AND DISCUSSION

Example 1 (System A)

A mixture of 414 g (0.103 mole) of a conventional polyoxypropylene polyol, having a specified hydroxyl number of 27.9 and correspondingly a molecular weight of 4021 (Voranol P 4000, Dow Chemicals) and 36.1 g (0.144 mole) of 4,4'-diphenylmethane diisocyanate (4,4'-MDI, Isonate M 125, Dow Chemicals), giving a NCO/OH ratio of 1.4, adding 60 ppm dibutyltin dilaurate (DBTDL) and 20 ppm of benzoylchloride as a reaction catalyst-retarder system, respectively, was held under constant stirring (30 rpm) at 70–75° C. for about 3 hours to reduce its NCO content to approximately 0.8% wt. Then this isocyanate terminated polyurethane prepolymer (PUR A) was reacted with the corresponding amount of 21.4 g (0.084 mole) of N-phenyl-gamma-aminopropyltrimethoxysilane (Silane I) to form the silylated polyurethane SPUR A. The reaction was held at 70–75° C. until the NCO content was zero.

Example 2 (System B)

A mixture of 322 g (0.082 mole) of a low-unsaturation polyoxypropylene polyol having a specified unsaturation level of 0.005 meq/g, a specified hydroxyl number of 28.4 and a corresponding molecular weight of 3950 (Acclaim™ 4200, ARCO Chemical) and 28.5 g (0.114 mole) of 4,4'-diphenylmethane diisocyanate (4,4'-MDI, Isonate M 125, Dow Chemicals), giving a NCO/OH ratio of 1.4, adding 20 ppm DBTDL as catalyst, was held under constant stirring (30 rpm) at 70–75° C. for about 3 hours to reduce its NCO content to approximately 0.8% wt. Then this isocyanate terminated polyurethane prepolymer (PUR B) was reacted with the corresponding amount of 18.6 g (0.073 mole) of N-phenyl-gamma-aminopropyltrimethoxysilane (Silane I) to form the silylated polyurethane SPUR B. The reaction was held at 70–75° C. until the NCO content was zero.

Example 3 (System C)

A mixture of 382 g (0.094 mole) of a low-unsaturation polyoxypropylene polyol, having specified unsaturation level of 0.005 meq/g, a specified hydroxyl number of 27.6 and a corresponding molecular weight of 4065 (Acclaim™ 4200, ARCO Chemicals) and 14.5 g (0.058 mole) of 4,4'-MDI (Isonate M 125, Dow Chemicals), giving a NCO/OH ratio of 0.62, adding 20 ppm of DBTDL as catalyst, was held under constant stirring (30 rpm) at 70–75° C. for about 3 hours to reduce its NCO content to zero. Then this hydroxyl group terminated polyurethane prepolymer (PUR C) was reacted with 14.6 g (0.071 mole) of gamma-isocyanatopropyltrimethoxysilane (Silane II) to form the silylated polyurethane SPUR C. The reaction was held at 70–75° C. until the NCO content was again zero.

Example 4 (System D)

A mixture of 311.4 g (0.038 mole) of a low-unsaturation polyoxypropylene polyol, having specified unsaturation level of 0.005 meq/g, a specified hydroxyl number of 13.8 and a corresponding molecular weight of 8130 (Acclaim™ 8200, ARCO Chemicals) and 4.3 g (0.019 mole) of IPDI (Vestanate, Hüls), giving a NCO/OH ratio of 0.5, adding 40 ppm of dibutyltin dilaurate as catalyst, was held under constant stirring (30 rpm) at 70–75° C. for about 3 hours to reduce its NCO content to zero. Then this hydroxyl group terminated polyurethane prepolymer (PUR D) was reacted with 9.93 g (0.04 mole) of gamma-isocyanatopropyltriethoxysilane (Silane III) to form the silylated polyurethane SPUR D. The reaction was held at 70–75° C. until the NCO content was again zero.

Example 5 (System E)

A mixture of 238.1 g (0.029 mole) of a low-unsaturation polyoxypropylene polyol, having specified unsaturation level of 0.005 meq/g, a specified hydroxyl number of 13.8 and a corresponding molecular weight of 8130 (PPO, Acclaim™ 8200, ARCO Chemicals) and 4.35 g (0.019 mole) of IPDI (Vestanate, Hüls), giving a NCO/OH ratio of 0.67, adding 40 ppm of dibutyltin dilaurate as catalyst, was held under constant stirring (30 rpm) at 70–75° C. for about 3 hours to reduce its NCO content to zero. Then this hydroxyl group terminated polyurethane prepolymer (PUR E) was reacted with 5.06 g (0.02 mole) of gamma-isocyanatopropyltriethoxysilane (Silane III) to form the silylated polyurethane SPUR E. The reaction was held at 70–75° C. until the NCO content was again zero.

TABLE 1

Polymer Structure Overview and Viscosities

| System | A | B | C | D | E |
| --- | --- | --- | --- | --- | --- |
| polyol | P 4000 | Acc 4200 | Acc 4200 | Acc 8200 | Acc 8200 |
| isocyanate | MDI M 125 | MDI M 125 | MDI M 125 | IPDI | IPDI |
| NCO/OH ratio | 1.4 | 1.4 | 0.62 | 0.5 | 0.67 |
| silane endcapper | I | I | II | III | III |
| calcul. approx. MW | 11,000 | 11,000 | 12,000 | 17,000 | 25,000 |
| silylated polyurethane viscosity (Pa.s) | 115.2 | 243.2 | 76.8 | 57.6 | 96.0 |

TABLE 2

Polymer Film Properties

| System | A | B | C | D | E |
| --- | --- | --- | --- | --- | --- |
| tear (N/mm) | 1.6 | 4.4 | 2.4 | 2.5 | 2.6 |
| tensile at break (MPa) | 0.3 | 1.0 | 0.7 | 0.5 | 0.4 |
| elongat. at break (%) | 248 | 169 | 60 | 125 | 326 |
| 100% modulus (MPa) | 0.1 | 0.7 | — | 0.4 | 0.14 |
| Shore A | 9 | 37 | 47 | 26 | 12 |
| residual tack* | 1 | 3 | 4 | 4 | 3 |

*The residual tack of the cured systems was observed by finger touch and was measured on a scale 4 to 0, where 4 stands for no residual tack and 0 for very tacky of the completely cured product.

Examples 6 to 10 (System F to K):

The sealant systems—Examples F to K—were formulated using the procedure described above. The following ingredients and amounts were used:

| Ingredient | phr |
| --- | --- |
| Silylated Polyurethane | 100 |
| DIDP | 40 |
| CaCO₃*(0.07 μm) | 90 |
| SiO₂* | 2 |
| TiO₂* | 5 |
| A-171 | 1 |
| A-1120 | 2 |
| DBTDL | 0.15 |

*surface treated

The performance properties of the sealants are summarized in Table 3.

TABLE 3

| | Sealant Properties | | | | |
|---|---|---|---|---|---|
| System | F | G | H | I | K |
| prepolymer | A | B | C | D | E |
| viscosity (Pa.s) | 172.8 | 467.2 | 92.8 | 121.6 | 313.6 |
| tear (N/mm) | 4.9 | 8.2 | 6.6 | 8.0 | 8.9 |
| tensile at break (MPa) | 1.5 | 2.7 | 2.7 | 2.35 | 1.94 |
| elongation at break (%) | 236 | 194 | 147 | 234 | 469 |
| 100% modulus (MPa) | 0.7 | 1.7 | 2.2 | 1.2 | 0.6 |
| ShoreA | 25 | 49 | 62 | 23 | 27 |
| residual tack* | 2 | 4 | 4 | 4 | 4 |

*The residual tack of the cured systems was observed by finger touch and was measured on a scale 4 to 0, where 4 stands for no residual tack and 0 for very tacky of the completely cured product.

Direct comparison of Systems A and B and of their related sealants F and G, respectively, reveals the distinct influence of employing either conventional or low-unsaturation type of polyether polyols for this technology. Polyether polyols with an extremely low level of terminal ethylenic unsaturation, being generally less than 0.2, preferably less than 0.02, meq/g of polyol, allow for the synthesis of silylated urethane polymers with increased molecular weight via the polyaddition reaction without sacrificing mechanical properties or increasing residual surface tack. The increase in tear strength (175% and 67% for polymer film and sealant, respectively), tensile strength at break (233% and 80% for polymer film and sealant, respectively), 100% modulus, and Shore A, and the lower values for elongation at break, all reflect the higher functionality and therefore the improved crosslinking network.

Comparison of Systems B and C and of their related sealants G and H, respectively, demonstrates the impact of either using amino silanes or isocyanate silanes for silane endcapping on the viscosities of the systems. The isocyanate silane endcapping leads to distinctively lower viscosities of silylated prepolymers of similar molecular weight, such as the reduction of viscosity by a factor of three in the example shown. This property typically carries over to the corresponding sealant formulations as well, such as the reduction of viscosity by a factor of 5 in the example shown.

Systems D and E demonstrate the ability to build up silylated polyurethanes of extended chain length and still obtain favorable viscosities by polyaddition reaction. Polyether polyols of low unsaturation level allow for the synthesis of high enough molecular weight urethane prepolymers to enable the use of trifunctional silanes for endcapping without sacrificing flexibility. System E and its related sealant formulation K illustrate the present invention in a comprehensive way: The employment of low unsaturation polyether polyols allows for the synthesis of urethane prepolymers with extended chain length, endcapped with trifunctional isocyanate silanes, having low viscosities, showing good mechanical properties and flexibilities, with the added benefit of lower residual tack and faster cure profiles.

What is claimed is:

1. A process for preparing a silylated polyurethane, comprising
   (A) reacting (i) a polyol component having terminal unsaturation less than 0.02 milliequivalents per gram of polyol with a molecular weight of 2,000–20,000 daltons, with (ii) a diisocyanate component at a stoichiometric excess of said polyol component to said diisocyanate component, whereby a polyurethane prepolymer is formed which is hydroxyl-terminated; and
   (B) reacting said polyurethane prepolymer with one or more isocyanate silanes of the formula (1)

$$\text{OCN—R—Si—(X)}_m\text{(—OR}^1)_{3-m} \tag{1}$$

wherein m is 0, 1 or 2, each $R^1$ is alkyl containing 1 to 4 carbon atoms, each X is alkyl containing 1 to 4 carbon atoms, and R is a difunctional organic group, to endcap the hydroxyl groups on said prepolymer with said isocyanate silane.

2. A process according to claim 1 wherein R is difunctional straight or branched alkyl containing 2 to 6 carbon atoms.

3. A process according to claim 1 wherein each $R^1$ is methyl or ethyl.

4. A process according to claim 1 wherein each X is methyl or ethyl.

5. A process according to claim 1 wherein m is zero.

6. A process according to claim 1 wherein m is one.

7. A process according to claim 1 wherein said isocyanate silane of formula (1) is gamma-isocyanatopropyl-trimethoxysilane.

8. A process according to claim 1 wherein said isocyanate silane of formula (1) is gamma-isocyanatopropyl-triethoxysilane.

9. A process according to claim 1 wherein said diisocyanate component is selected from the group consisting of 2,4-toluene diisocyanate, 2,6-toluene diisocyanate, 4,4'-diphenyl-methanediisocyanate, 2,4'-diphenyl-methanediisocyanate, isophorone diisocyanate, 4,4'-dicyclohexylmethane-diisocyanate-isomers, and mixtures thereof.

10. A silylated polyurethane prepared by a process comprising
    (A) reacting (i) a polyol component having terminal unsaturation less than 0.02 milliequivalents per gram of polyol with a molecular weight of 2.000–20.000 daltons, with (ii) a diisocyanate component at a stoichiometric excess of said polyol component to said diisocyanate component, whereby a polyurethane prepolymer is formed which is hydroxyl-terminated; and
    (B) reacting said polyurethane prepolymer with one or more isocyanate silanes of the formula (1)

$$\text{OCN—R—Si—(X)}_m\text{(—OR}^1)_{3-m} \tag{1}$$

wherein m is 0, 1 or 2, each $R^1$ is alkyl containing 1 to 4 carbon atoms, each X is alkyl containing 1 to 4 carbon atoms, and R is a difunctional organic group, to endcap the hydroxyl groups on said prepolymer with said isocyanate silane.

11. A silylated polyurethane according to claim 10 wherein R is difunctional straight or branched alkyl containing 2 to 6 carbon atoms.

12. A silylated polyurethane according to claim 10 wherein each $R^1$ is methyl or ethyl.

13. A silylated polyurethane according to claim 10 wherein each X is methyl or ethyl.

14. A silylated polyurethane according to claim 10 wherein m is zero.

15. A silylated polyurethane according to claim 10 wherein m is one.

16. A silylated polyurethane according to claim 10 wherein said isocyanate silane of formula (1) is gamma-isocyanatopropyl-trimethoxysilane.

17. A silylated polyurethane according to claim 10 wherein said isocyanate silane of formula (1) is gamma-isocyanatopropyl-triethoxysilane.

18. A silylated polyurethane according to claim 10 wherein said diisocyanate component is selected from the group consisting of 2,4-toluene diisocyanate, 2,6-toluene diisocyanate, 4,4'-diphenyl-methanediisocyanate, 2,4'-diphenyl-methanediisocyanate, isophorone diisocyanate, 4,4'-dicyclohexylmethane-diisocyanate-isomers, and mixtures thereof.

* * * * *